United States Patent
Chun (10) Patent No.: US 12,275,352 B2
(45) Date of Patent: Apr. 15, 2025

(54) AUTOMATIC FOG IDENTIFICATION METHOD USING FRONT CAMERA IMAGE AND EMERGENCY FOG LED HIGH BEAM SYSTEM USING THE SAME

(71) Applicant: YIRURI CO. LTD, Busan (KR)

(72) Inventor: Kue Sang Chun, Busan (KR)

(73) Assignee: YIRURI CO. LTD, Busan (KR)

( * ) Notice: Subject to any disclaimer, the term of this patent is extended or adjusted under 35 U.S.C. 154(b) by 0 days.

(21) Appl. No.: 18/654,736

(22) Filed: May 3, 2024

(65) Prior Publication Data

US 2024/0286550 A1 Aug. 29, 2024

Related U.S. Application Data (63) Continuation of application No. 17/513,163, filed on Oct. 28, 2021, now abandoned.

(30) Foreign Application Priority Data

Nov. 24, 2020 (KR) .................. 10-2020-0158990

(51) Int. Cl.

| | |
|---|---|
| *B60R 1/24* | (2022.01) |
| *B60Q 1/20* | (2006.01) |
| *G02B 27/01* | (2006.01) |
| *G06V 10/60* | (2022.01) |

(Continued)

(52) U.S. Cl.
CPC .................. *B60R 1/24* (2022.01); *B60Q 1/20* (2013.01); *G02B 27/0101* (2013.01); *G06V 10/60* (2022.01); *G06V 20/56* (2022.01); *H04N 5/33* (2013.01); *B60Q 2300/312* (2013.01); *B60R 2300/103* (2013.01); *B60R 2300/205* (2013.01); *B60R 2300/8053* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| 9,977,978 B2 * | 5/2018 | Coulter .................... G06T 7/33 |
|---|---|---|
| 2007/0242470 A1 * | 10/2007 | Michiyama .............. B60Q 1/20 |
| | | 362/464 |

(Continued)

FOREIGN PATENT DOCUMENTS

| JP | 2007-276704 A | 10/2007 |
|---|---|---|
| KR | 10-2005-0006913 A | 1/2005 |

(Continued)

OTHER PUBLICATIONS

Korean Office Action for related KR Application No. 10-2020-0158990 mailed Mar. 10, 2022 from Korean Intellectual Property Office.

*Primary Examiner* — Xiaolan Xu (74) *Attorney, Agent, or Firm* — Paratus Law Group, PLLC (57) ABSTRACT

An automatic fog identification method using a front camera image and an emergency fog red LED high beam system using the same are proposed. The emergency fog red LED high beam system is configured such that a red LED module is applied to a high beam light source, thus providing a clear and wide view for a driver without diffused reflection even in a foggy situation.

1 Claim, 5 Drawing Sheets

(51) Int. Cl.
    *G06V 20/56*        (2022.01)
    *H04N 5/33*         (2023.01)

(56)            References Cited

U.S. PATENT DOCUMENTS

2014/0009066 A1*  1/2014  Bouffay .................... F21L 4/00
                                                        315/158
2020/0158308 A1*  5/2020  Kitazawa .............. F21S 41/148
2020/0170093 A1*  5/2020  Mirsky .................. F21S 8/085

FOREIGN PATENT DOCUMENTS

KR      10-2013-0107424  A     10/2013
KR      10-2015-0070580  A      6/2015
KR          10-1792433  B1     10/2017
KR          10-1907508  B1     10/2018
KR          10-1964091  B1      4/2019

* cited by examiner

AUTOMATIC FOG IDENTIFICATION METHOD USING FRONT CAMERA IMAGE AND EMERGENCY FOG LED HIGH BEAM SYSTEM USING THE SAME

CROSS-REFERENCE TO PRIOR APPLICATIONS

This application is a Continuation Application of U.S. patent application Ser. No. 17/513,163 (filed on Oct. 28, 2021), which claims priority to Korean Patent Application No. 10-2020-0158990 (filed on Nov. 24, 2020), which are all hereby incorporated by reference in their entirety.

BACKGROUND

The present disclosure relates to a high beam and, more particularly, to an automatic fog identification method using a front camera image and a high beam emergency fog LED high beam system using the same.

In general, the main causes of traffic accidents include speeding, bad weather, drunk driving, drowsy driving, carelessness, etc. In particular, even a person skilled in driving should concentrate on driving in rainy or foggy weather. As such, since rain or fog interferes a driver's view and affects the braking distance of the vehicle, increasing the risk of traffic accidents.

For example, according to the traffic accident fatality due to meteorological disasters published by Korea Transportation Safety Authority, the fatality of foggy days (8.9) is about 3.7 times higher than that of sunny days (2.4), and the fatality of rainy days (3.0) is three times higher than that of sunny days.

Especially when fog is thick, it is difficult for a driver as well as a pedestrian to secure a sufficiently clear view, thus increasing the risk of a collision accident or a jaywalking accident. Further, since most drivers tend to drive a vehicle even on a foggy road at the same speed as they do on a fine day, and keep a distance between vehicles similar to a distance when driving the vehicle on a fine day, an accident on a foggy road may lead to a big accident.

In order to reduce traffic accidents when the fog occurs, it is necessary to secure a driver's view in a foggy situation. Thus, a driver sometimes turns on a high beam of a vehicle in the foggy situation. However, the conventional high beam for the vehicle is problematic in that it uses a white lightly, so diffused reflection occurs severely in the foggy situation, thereby making it difficult to secure a driver's view.

In particular, Korean Patent No. 10-1907508 entitled "Method of determining fog level" has disclosed a method of determining the presence of fog and the level of fog. However, it is difficult to apply this method to an actually driving vehicle and use this method by a driver.

DOCUMENTS OF RELATED ART (Patent Document 1) KR 2013-0107424 (Method and system of detecting and predicting foggy situation in real time and control system using the same)
(Patent Document 2) KR 10-1964091 (Automatic color conversion system for vehicle headlight)

SUMMARY

In view of the above, the present disclosure provides an automatic foggy situation identification method using a front camera image and a emergency fog red LED high beam system using the same, which allow a driver to safely drive a vehicle without difficulty in securing a view even in a foggy situation.

According to embodiments of the present disclosure, a emergency fog red LED high beam system may include a red LED high beam light-source unit provided at a position corresponding to a high beam light-source unit of a vehicle, and configured to irradiate light of a red wavelength ranging from 630 nm to 700 nm in foggy conditions.

The emergency fog LED high beam system may further include a camera unit configured to photograph shoot a situation outside the vehicle; and an automatic fog detector configured to determine the presence of fog or a level value, wherein the automatic fog detector may determine the presence of fog by comparing a luminosity standard deviation of a plurality of coordinates in a reference image showing an external foggy situation in front of the vehicle, which is set by a user, with a luminosity standard deviation of a plurality of coordinates in an image showing an external current situation in front of the vehicle, which is acquired through the camera unit, while the vehicle is moving.

The emergency fog LED high beam system may further include a near-infrared irradiator configured to irradiate a near-infrared ray of 700 nm to 970 nm according to a user's selection, wherewith the camera unit is formed of a CCD camera, so the situation in front of the vehicle to which the near-infrared ray is irradiated by the near-infrared irradiator is shot by the CCD camera, and then the photographed image is shown to a driver through a head-up display (HUD) provided in the vehicle.

The emergency fog LED high beam system may further include a controller configured to control the emergency fog red LED high beam system, wherein the red LED high beam light-source unit may include at least one red LED module, and the controller may control the red LED module according to the fog level value determined by the automatic fog detector to control the light quality, light width, and pattern of a red-wavelength high beam irradiated upwards and forwards from the vehicle.

The emergency fog red LED high beam system may further include a fog occurrence prediction unit to predict the occurrence of fog, and the controller may control the red LED high beam light-source unit to irradiate the red-wavelength high beam upwards and forwards from the vehicle, before the vehicle enters a foggy road zone predicted by the fog occurrence prediction unit.

The red LED high beam light-source unit and the near-infrared irradiator configured to irradiate the near-infrared ray of 700 nm to 970 nm are provided in a rotatable rotary unit in one or more combinations to irradiate the red-wavelength ray of 630 nm to 700 nm or the near-infrared ray of 700 nm to 970 nm to an outside in front of the vehicle, individually or in combination, according to a user's selection, and the camera unit shall show the image photographed by the camera through the head-up display (HUD) provided in the vehicle to the driver.

Further, an automatic fog identification method using a front camera image may include a image acquisition step of acquiring a reference image of an external situation in front of a vehicle, which is determined by a user as a fog-occurrence reference situation; a reference-image luminosity detection step of detecting the luminosity of each of any one or more coordinates in the reference image; a reference-image standard deviation value detection step of obtaining a standard deviation value for the luminosity of each of the coordinates detected through the reference-image luminosity detection step; a current-image acquisition step of acquiring an image of a current situation outside the vehicle using a camera provided in the vehicle; a current-image luminosity detection step of detecting the luminosity of each of any one or more coordinates in the current image; a current-image standard deviation value detection step of obtaining the standard deviation value for the luminosity of each of the coordinates detected through the current-image luminosity detection step; and a fog determination step of determining the occurrence of fog by comparing the reference-image standard deviation value and the current-image standard deviation value.

A emergency fog red LED high beam system according to the present disclosure is advantageous in that a red LED module is applied to a high beam light source, thus providing a clear and wide view for a driver without diffused reflection even in a foggy situation.

The present disclosure is advantageous in that it is possible to provide a safe driving environment even in a foggy situation without interrupting a driver's driving by automatically identifying fog using a front camera image in a foggy situation.

DETAILED DESCRIPTION

It is to be understood that the present disclosure may be used or implemented in various ways without being limited to the configuration shown in the following detailed description or the accompanying drawings, before the detailed description of an embodiment of the present disclosure.

Further, it should be noted that expressions or terminology used herein is merely illustrative and is not restrictive.

As used herein, the expressions "mounted", "installed", "connected", "linked", "supported", "coupled", etc., include both direct and indirect mounting, installation, connection, link, support, and coupling unless otherwise indicated. The expressions "connected", "linked", or "coupled" are not limited to physical or mechanical connection, link, or coupling.

In this specification, terms indicating directions such as upper, lower, downward, upward, rearward, bottom, front, or rear are used to describe drawings, but these terms are used to indicate relative directions in the drawings for convenience (when viewed normally). These directional terms are not considered as literally limiting the present disclosure in any form.

Furthermore, as used herein, terms such as "first", "second", or "third" are merely for illustrative purposes and should not be considered as implying relative importance.

Hereinafter, an embodiment of the present disclosure will be described in detail with reference to the accompanying drawings.

Figure 1:
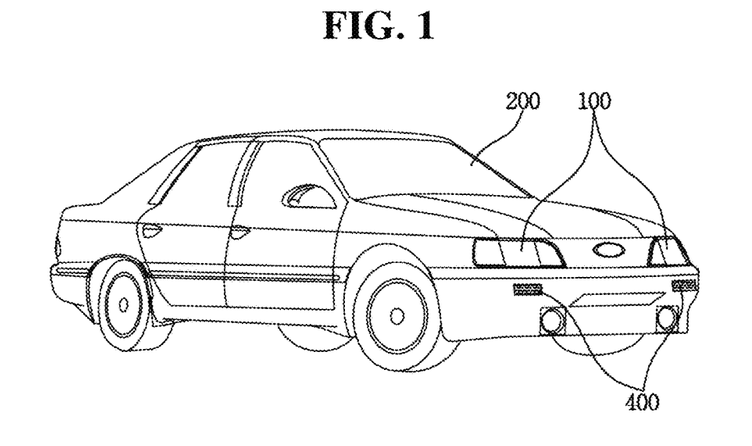
FIG. 1 is a reference diagram illustrating a vehicle to which a emergency fog red LED high beam system is applied, according to an embodiment of the present disclosure.
Figure 2:
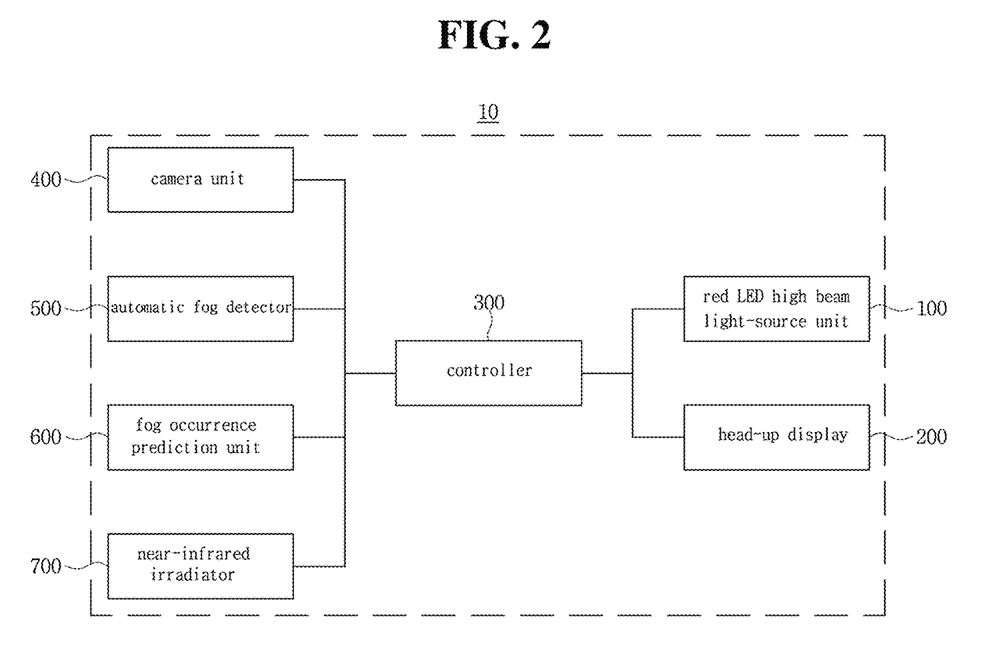
FIG. 2 is a diagram showing the configuration of the emergency fog red LED high beam system according to an embodiment of the present disclosure.

FIG. 1 is a reference diagram illustrating a vehicle to which a emergency fog red LED high beam system 10 is applied, according to an embodiment of the present disclosure, and FIG. 2 is a diagram showing the configuration of the emergency fog red LED high beam system 10 according to an embodiment of the present disclosure. The emergency fog red LED high beam system 10 (hereinafter, referred to as the "high beam system") according to an embodiment of the present disclosure is provided in the vehicle to clearly secure a driver's view in a emergency fog situation where it is difficult to secure a clear view.

To this end, the high beam system 10 according to an embodiment of the present disclosure includes a red LED high beam light-source unit 100, a head-up display 200, a controller 300, a camera unit 400, an automatic fog detector 500, a fog occurrence prediction unit 600, and a near-infrared irradiator 700.

Figure 3:
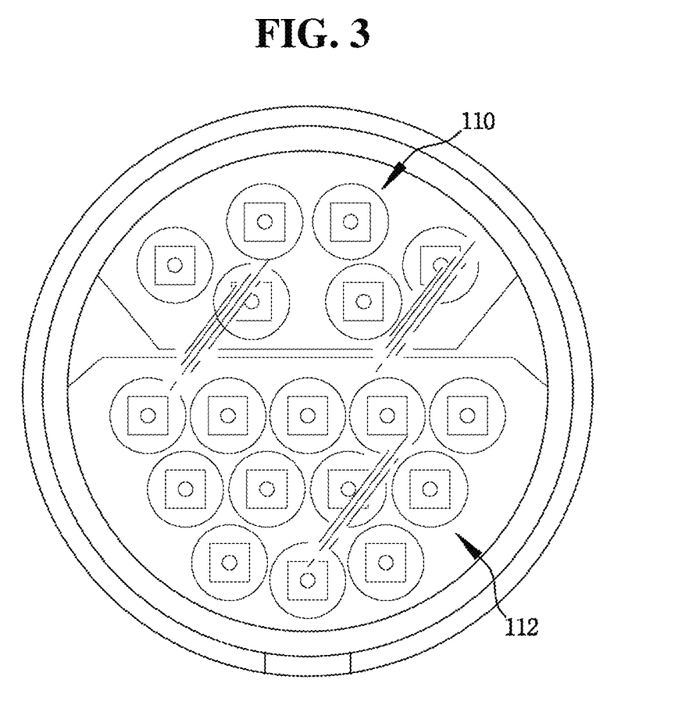
FIG. 3 is a reference diagram showing a red LED high beam light-source unit according to an embodiment of the present disclosure.

First, in the description of the red LED high beam light-source unit 100, FIG. 3 is a reference diagram showing the red LED high beam light-source unit 100 according to an embodiment of the present disclosure. A headlight of the vehicle is usually divided into a high beam part and a lower beam part, which are provided with a LED light source 110 for the high beam and a LED light source 112 for the lower beam.

The red LED high beam light-source unit 100 according to an embodiment of the present disclosure is the red LED high beam light-source unit 100 including the LED light source 110 for the high beam that irradiates the red wavelength of 630 nm to 700 nm.

When the general headlight of the vehicle meets fog in white light, light is diffusely reflected in white due to the diffused reflection of the light, so an object behind the fog is invisible.

The light is diffusely reflected depending on a particle size according to the theory of Rayleigh Scattering and Mie Scattering (when a particle size is larger than the wavelength of light). The fog looks hazy in white due to the Mie Scattering. The shorter the light wavelength is, the more intense the reflection is. The longer the wavelength is, the higher the transmittance is.

Light is composed of three primary colors of red, green, and blue. When the three primary colors are combined, white light is obtained.

The red LED high beam light-source unit 110 according to an embodiment of the present disclosure irradiates only the red light having the longest wavelength in visible light band and reduces the diffused reflection by about 60%.

Therefore, if the intensity of the light source of the red LED high beam light-source unit 110 is increased by 60% or more, the diffused reflection is reduced and the quantity of red light transmitted in the fog is increased, so a driver can clearly recognize the external environment in front of the vehicle up to a distance of 100 meters ahead even in a foggy situation.

Although the red LED high beam light-source unit 100 according to an embodiment of the present disclosure has been described with a case where the vehicle is divided into the high beam and the lower beam as such, it may be modified in various ways, for example, only some of the light sources may be configured as the red LED light source, according to a user's selection, even in the case of the vehicle headlight in which the high beam and the lower beam are integrally formed.

Figure 4:
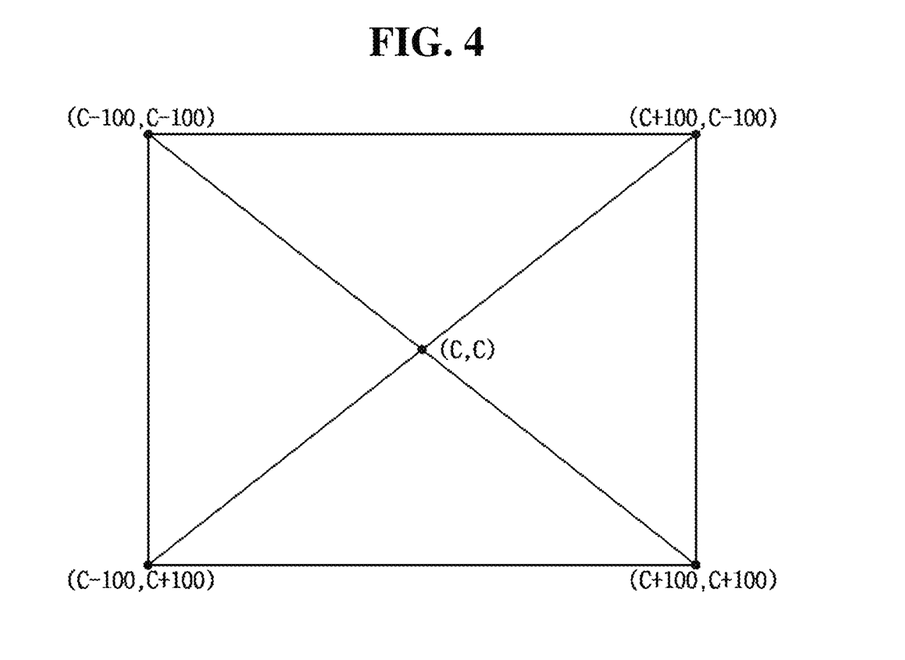
FIGS. 4 and 5 are a reference diagram and a flowchart showing an automatic fog identification method using a front camera image according to an embodiment of the present disclosure.
Figure 5:
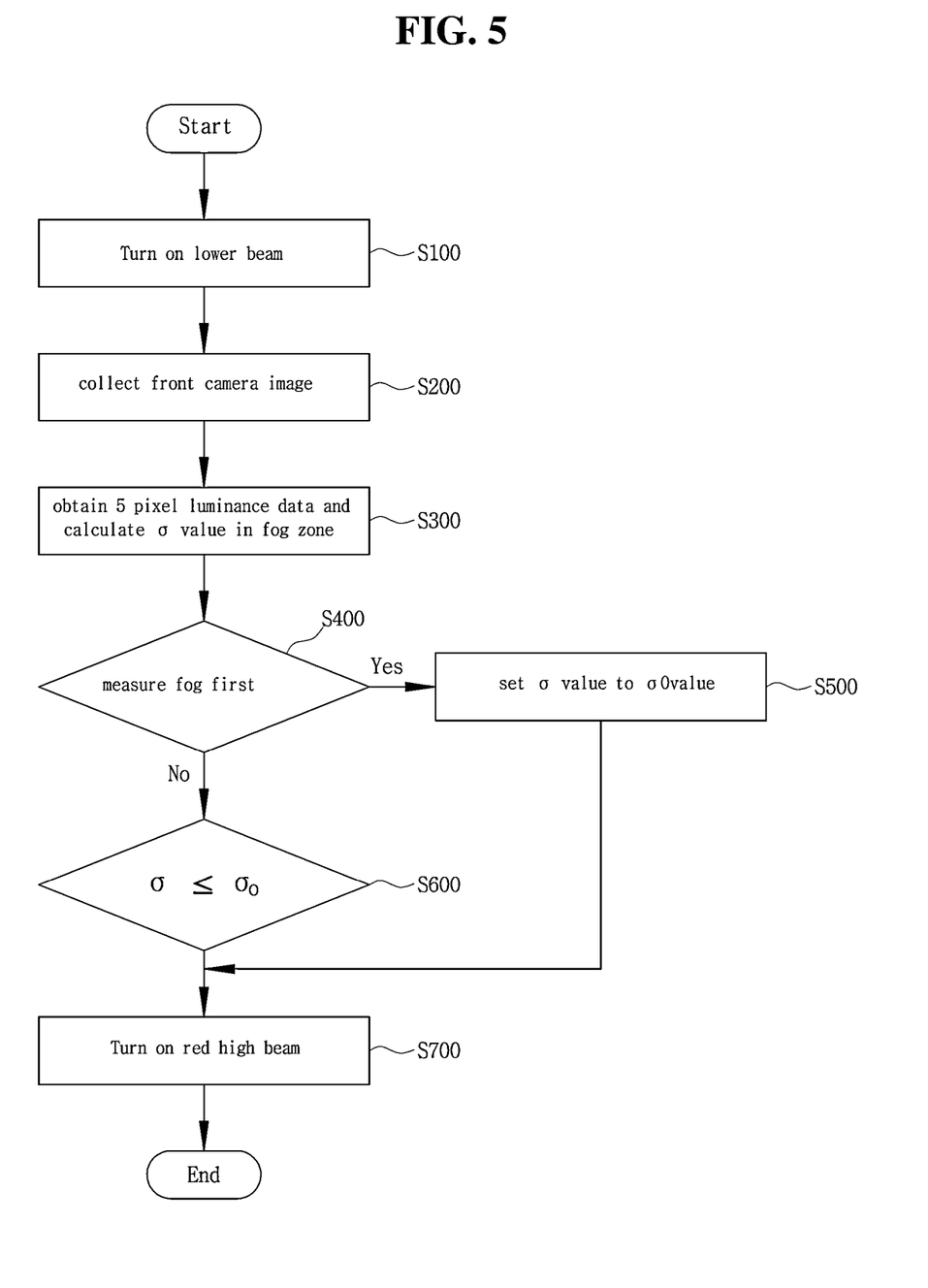

FIGS. 4 and 5 are a reference diagram and a flowchart showing an automatic fog detection method using a front camera image according to an embodiment of the present disclosure. Hereinafter, the automatic fog identification method using the front camera image will be described in detail with reference to FIGS. 4 and 5.

The high beam system 10 according to an embodiment of the present disclosure includes an automatic fog detector 500, and is configured to variously set a foggy situation reference value according to a user's selection using the following method.

In other words, a user sets the foggy situation reference value in various ways according to the user's eyesight, driving habits, and vehicle headlight conditions. Only when the value is equal to or less than the reference value, the high beam of the red wavelength is irradiated.

The headlight is irradiated in a first foggy situation, the camera image is shown almost in white because the white light of the headlight is diffusely reflected by the fog, and a contrast is significantly lowered, so it is impossible to identify an object. In this case, the luminosity of each pixel is almost the same, so a standard deviation value is very low. At this time, a user sets a reference standard deviation value, $\sigma_o$ for the first time of the fog encounter. If the standard deviation value of the image, $\sigma$, acquired while the vehicle is running, is equal to or less than the reference standard deviation value $\sigma_o$, this is recognized as a foggy situation.

To this end, the automatic fog identification method using the front camera image according to an embodiment of the present disclosure includes a reference image acquisition step of acquiring a reference image of an external situation in front of a vehicle, which is determined by a user as at a first fog occurrence; a reference-image luminosity detection step of detecting the luminosity of each of any one or more pixel coordinates in the reference image; and a reference-image standard deviation value calculation step of obtaining a standard deviation value for the luminosity of each of the pixel coordinates detected through the reference-image luminosity detection step.

Further, the method includes a current-image acquisition step of acquiring an image of a situation outside the vehicle, using a camera provided in the vehicle; a current-image luminosity detection step of detecting the luminosity of each of any one or more pixel coordinates in the current image; a current-image standard deviation value calculation step of obtaining the standard deviation value for the luminosity of each of the pixel coordinates detected through the current-image luminosity detection step; and a fog determination step of determining the occurrence of fog by comparing the reference-image standard deviation value, Go and the current-image standard deviation value $\sigma$.

First, the reference image acquisition step of acquiring the reference image of the external situation in front of the vehicle, which is determined by the user as at the first fog occurrence, is the step of acquiring the reference image that may be determined as the fog occurrence depending on a fog level even in a situation where the user starts driving the vehicle and meets the fog for the first time. Such a reference image may be selected and used by the user from among images photographed by the camera unit 400.

Next, the reference-image luminosity detection step of detecting the luminosity of each of any one or more pixel coordinates in the region of interest of the reference image sets a central coordinate (C, C) and respective vertex coordinates (C−100, C−100) to (C+100, C+100) of a square having the central coordinate (C, C) as a center in the reference image shown in FIG. 4. The reference image usually uses the image of 1,800×1,200 pixel, and the central coordinate (C, C) is the region of interest (ROI) of the reference image.

Further, the luminosity L0, L1, L2, L3, and L4 of ROI and the respective vertex pixel coordinates (C−100, C−100) to (C+100, C+100) are detected.

Next, the reference-image standard deviation value go computation step obtains the standard deviation values of the luminosity L0, L1, L2, L3, and L4 for the ROI and the respective vertex coordinates.

A method of calculating the standard deviation value is as follows.

$$\sigma = \sqrt[2]{\sum \frac{(Li - \mu)2}{5}}$$ [Equation 1]

(where σ=standard deviation, μ=average value of L0 to L4 values)

Next, the current-image acquisition step of acquiring the image of the current situation outside the vehicle using the camera provided in the vehicle, the current-image luminosity detection step of detecting the luminosity of each of any one or more coordinates in the ROI of the current image, and the current-image standard deviation value computation step of obtaining the standard deviation value for the luminosity of each of the coordinates in ROI of the current-image are steps of detecting the current-image standard deviation value for an external environment image of the currently driving vehicle in real time. Here, the image uses the real-time external image of the vehicle that is currently driving, and the method of calculating the standard deviation value is the same as above.

Next, in the fog determination step of determining the occurrence of fog by comparing the reference-image standard deviation value, $\sigma$, and the current-image standard deviation value $\sigma$, if the reference-image standard deviation value and the current-image standard deviation value are compared with each other and the current-image standard deviation value $\sigma$ is lower than the reference-image standard deviation value $\sigma_o$, the current situation is determined as the foggy situation.

When the current situation is determined as the foggy situation, the controller 300 shall guide the foggy situation to a driver using the head-up display 200 or shall automatically control the red LED high beam light-source unit 100 to irradiate the high beam of the red wavelength to the outside of the front of the vehicle. In particular, the red wavelength has good transmission in the fog in the foggy situation, and the red color alerts an emergency foggy situation around the vehicle.

Next, the high beam system 10 according to an embodiment of the present disclosure includes a near-infrared irradiator 700 configured to irradiate the near-infrared ray of 700 nm to 970 nm, and the camera unit 400 is formed of a CCD camera, so the situation in front of the vehicle to which the near-infrared ray is irradiated by the near-infrared irradiator 700 is photographed by the CCD camera, and then the photographed image is guided to a driver through the head-up display (HUD) 200 provided in the vehicle. Thereby, it is possible to guide a clearer front view to the driver in the foggy situation.

Next, in the high beam system 10 according to an embodiment of the present disclosure, the red LED high beam light-source unit 100 includes at least one red LED module, and the controller 300 controls each red LED module according to the standard deviation value calculated by the automatic fog detector 500 to control the light quantity, light width, and pattern of the red-wavelength high beam irradiated upwards and forwards from the vehicle.

Figure 6:
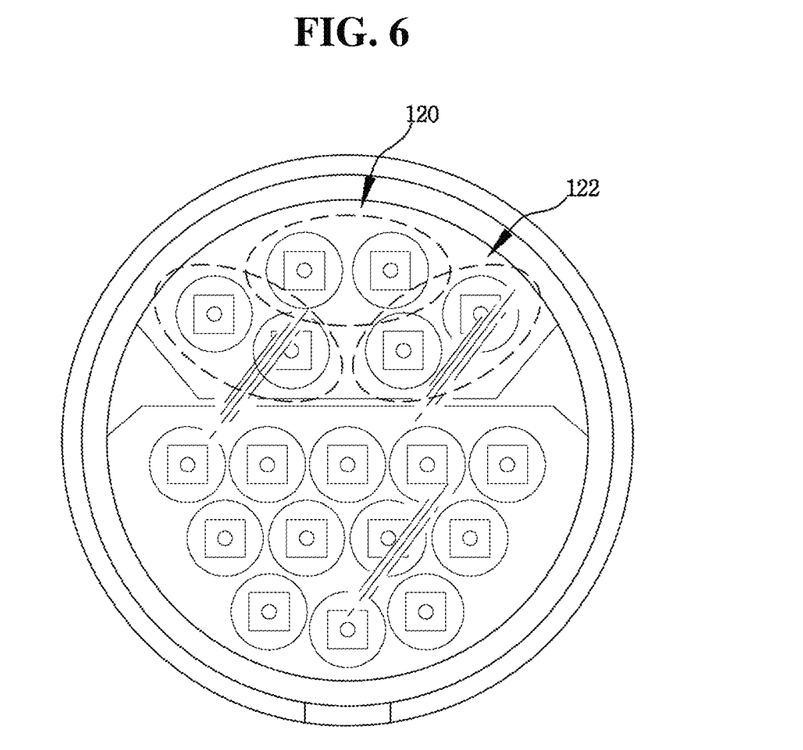
FIGS. 6 and 7 are reference diagrams showing the light quantity, light width, and pattern control of a high beam of a red wavelength.
Figure 7:
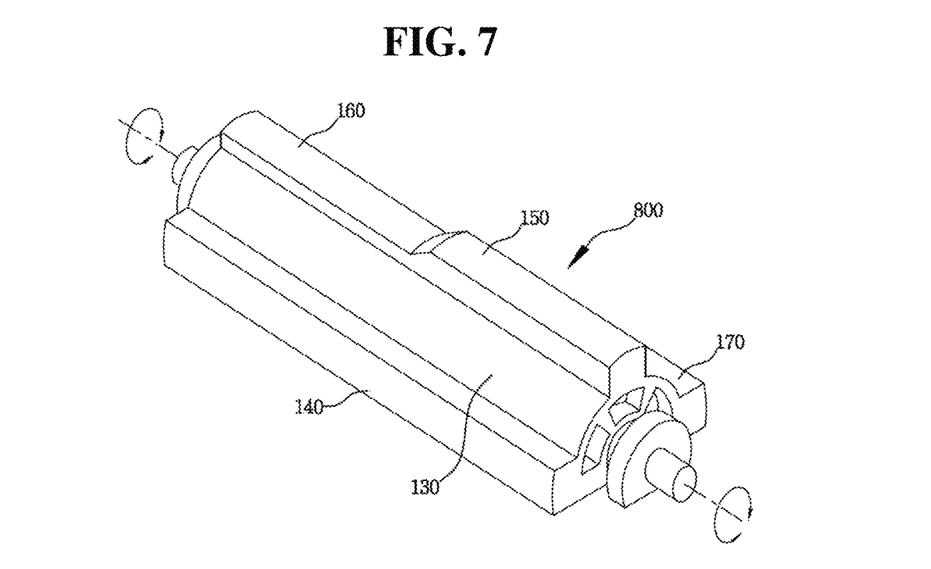
Figure 8:
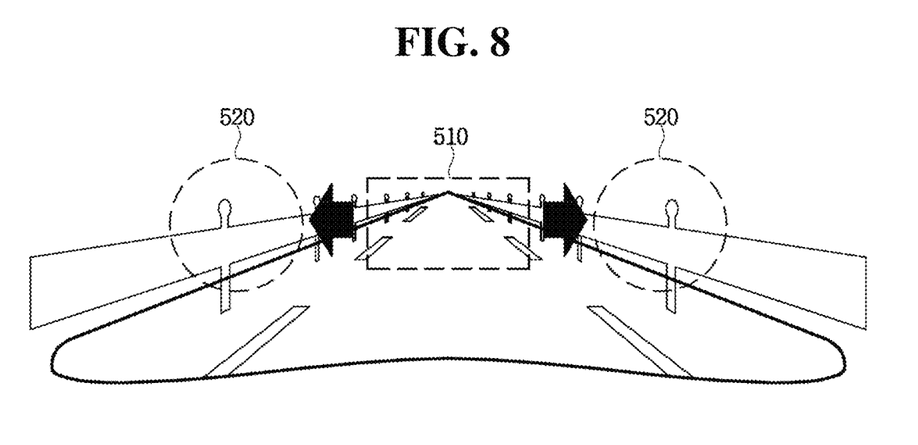
FIG. 8 is a perspective view showing a state in which the red LED high beam light-source unit and a near-infrared irradiator are provided in a rotatable rotary unit.

In other words, as shown in FIGS. 6, 7, and 8 in a stage where the fog standard deviation level value is low, the red LED module 120 located in the central portion of the high beam irradiates the high beam of the red wavelength to a central portion 510 in front of the vehicle. If the fog standard deviation level value is increased, the red LED module 122 provided on the outer part of the high beam irradiates the high beam of the red wavelength to both sides 520 in front of the vehicle. Thereby, it is possible to guide a front view corresponding to the foggy situation to the driver.

Alternatively, the standard deviation values for various external images of the vehicle measured by the automatic fog detector 500 may be obtained and graded to determine the fog standard deviation level value.

Next, the high beam system 10 according to an embodiment of the present disclosure further includes a fog occurrence prediction unit 600 that predicts the occurrence of fog, and the controller 300 controls the red LED high beam light-source unit 100 to irradiate the red-wavelength high beam upwards and forwards from the vehicle, before the vehicle enters a fog occurrence road zone predicted by the fog occurrence prediction unit 600.

The fog occurrence prediction unit 600 collects real-time traffic information that is guided through various means such as the traffic guidance of the Korea Highway Corporation, the traffic guidance of traffic broadcasting, and SNS to predict or predetermine the occurrence of fog on a road on which the vehicle is driving or a road on a navigation driving route.

Next, as shown in FIG. 8, in the high beam system 10 according to an embodiment of the present disclosure, the red LED high beam light-source unit 140 and the near-infrared irradiator 170 that irradiates the near-infrared ray of 700 nm to 970 nm are provided in a rotatable rotary unit (130) in one or more combinations to irradiate the red-wavelength ray of 630 nm to 700 nm and the near-infrared ray of 700 nm to 970 nm to an outside in front of the vehicle, individually or in combination, according to a user's selection.

Further, the camera unit 400 guides the image photographed by the camera through the head-up display (HUD) 200 provided in the vehicle to the driver.

In other words, as shown in FIG. 8, the red LED high beam light-source unit 140 and the near-infrared irradiator 170 may be provided in the rotary unit 130, or the red LED high beam light-source unit 160 and the near-infrared irradiator 150 may be provided on the same line.

Thereby, the rotary unit 130 is rotated to irradiate light to the outside in front of the vehicle in various combinations, depending on the fog occurrence, the fog standard deviation level value, and the like, using the determination information of the automatic fog detector 500 and the fog occurrence prediction unit 600.

Although the present disclosure was described with reference to specific embodiments shown in the drawings, it is apparent to those skilled in the art that the present disclosure may be changed and modified in various ways without departing from the scope of the present disclosure, which is described in the following claims.

DETAILED DESCRIPTION OF MAIN ELEMENTS

100: red LED high beam light-source unit
200: head-up display
300: controller
400: camera unit
500: automatic fog detector
600: fog occurrence prediction unit
700: near-infrared irradiator

What is claimed is:

1. An emergency fog LED high beam system comprising:
a red LED high beam light-source unit disposed at a location corresponding to a high beam light-source unit of a vehicle headlight, and configured to irradiate a red-wavelength high beam ranging from 630 nm to 700 nm in foggy conditions;
a camera unit configured to photograph a situation outside a vehicle;
a near-infrared irradiator disposed in the vehicle headlight and configured to irradiate a near-infrared ray of 700 nm to 970 nm according to a user's selection;
a head-up display provided in the vehicle to show a photographed image by the camera unit to a driver, and the photographed image being a situation in front of the vehicle where near-infrared rays are irradiated from the near-infrared irradiator;
an automatic fog detector configured to determine a presence of fog, wherein the automatic fog detector determines the presence of fog by comparing a first brightness-value standard deviation of a plurality of coordinates in a reference image showing an external foggy situation in front of the vehicle, with a second brightness-value standard deviation of a plurality of coordinates in an outside image showing an external current situation in front of the vehicle, which is acquired through the camera unit, while the vehicle is running;
a fog occurrence prediction unit configured to predict an occurrence of fog; and
a controller configured to control the red LED high beam light-source unit based on the present of fog determined by the automatic fog detector and a prediction of fog occurrence predicted by the fog occurrence prediction unit;
wherein the red LED high beam light-source unit and the near-infrared irradiator are mounted on a rotatable rotary unit in one or more combinations inside the vehicle headlight to irradiate a red-wavelength ray of 630 nm to 700 nm and the near-infrared ray of 700 nm to 970 nm to an outside in front of the vehicle, individually or in combination, according to a user's selection,
wherein, in order to calculate the first brightness-value standard deviation and the second first brightness-value standard deviation, the automatic fog detector is configured to
set a central coordinate (C, C) and respective vertex coordinates (C−100, C−100) to (C+100, C+100) of a square having the central coordinate (C, C) as a center, in the reference image and the outside image, respectively, detect a brightness (L0, L1, L2, L3, and L4) of the central coordinate (C, C) and the respective vertex coordinates (C−100, C−100) to (C+100, C+100), and calculate a brightness-value standard deviation of the brightness (L0, L1, L2, L3, and L4) as following equation:

$$\sigma = \sqrt[2]{\sum \frac{(Li - \mu)2}{5}},$$

where $\sigma$=brightness-value standard deviation, $\mu$=average value of L0 to L4 values, wherein the controller is configured to control the red LED high beam light-source unit based on a determination of the presence of fog by the automatic fog detector to control light quantity, light width, and pattern of the red-wavelength high beam irradiated from the red LED high beam light-source unit upward toward a travel direction of the vehicle, and wherein the controller is configured to control the red LED high beam light-source unit to irradiate the red-wavelength high beam upward toward the travel direction of the vehicle, before the vehicle enters a fog occurrence road zone predicted by the fog occurrence prediction unit.

\* \* \* \* \*